US011860312B2

(12) United States Patent
Wohlgenannt et al.

(10) Patent No.: US 11,860,312 B2
(45) Date of Patent: Jan. 2, 2024

(54) MULTI-BEAM MEASURING DEVICE WITH HIGH DIRECTIONAL STABILITY FOR 3D SCANNING OF AN ENVIRONMENT

(71) Applicant: HEXAGON TECHNOLOGY CENTER GMBH, Heerbrugg (CH)

(72) Inventors: Rainer Wohlgenannt, Klaus (AT); Jürg Hinderling, Marbach (CH); Simon Bestler, Langenargen (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 683 days.

(21) Appl. No.: 17/095,674

(22) Filed: Nov. 11, 2020

(65) Prior Publication Data

US 2021/0141064 A1    May 13, 2021

(30) Foreign Application Priority Data

Nov. 12, 2019  (EP) .................................... 19208687

(51) Int. Cl.
*G01S 7/48*  (2006.01)
*G01S 7/481*  (2006.01)
*G01S 17/894*  (2020.01)
*G01S 17/42*  (2006.01)

(52) U.S. Cl.
CPC ............ *G01S 7/4817* (2013.01); *G01S 17/42* (2013.01); *G01S 17/894* (2020.01)

(58) Field of Classification Search
None
See application file for complete search history.

(56) References Cited

U.S. PATENT DOCUMENTS

| | | | |
|---|---|---|---|
| 7,403,269 B2 | 7/2008 | Yamashita et al. | |
| 9,560,339 B2 | 1/2017 | Borowski | |
| 2011/0216304 A1* | 9/2011 | Hall | G01S 17/89 356/4.01 |
| 2019/0235082 A1* | 8/2019 | Gimpel | G01S 17/42 |

FOREIGN PATENT DOCUMENTS

| | | |
|---|---|---|
| DE | 10 2004 014 041 A1 | 10/2005 |
| DE | 10 2011 011 875 B3 | 7/2012 |
| DE | 10 2016 117 093 B3 | 6/2017 |
| EP | 2 656 100 A1 | 10/2013 |

OTHER PUBLICATIONS

European Search Report dated Jun. 3, 2020 as received in Application No. 19208687.4.

* cited by examiner

*Primary Examiner* — Hovhannes Baghdasaryan
(74) *Attorney, Agent, or Firm* — Maschoff Brennan

(57) ABSTRACT

A measuring device comprises a base, a case, and a rotating member rotatable about the axis of rotation. The rotating member comprises a transmission unit configured to emit transmission beams to different beam directions. The rotating member further comprises a receiver unit configured to receive returning transmission beams. A longitudinal member is fixed to the base and extends in a central area of the rotating member along the axis of rotation over a range including the transmission unit and the receiver unit. Two bearing members are arranged on the longitudinal member and on the rotating member. In the direction of the axis of rotation, the transmission unit and the receiver unit are located in a range between the two bearing members. The measuring device has a high aiming accuracy and low hysteresis of the turning transmission beams.

15 Claims, 3 Drawing Sheets

MULTI-BEAM MEASURING DEVICE WITH HIGH DIRECTIONAL STABILITY FOR 3D SCANNING OF AN ENVIRONMENT

CROSS-REFERENCE TO RELATED APPLICATIONS

This application claims priority to European Patent Application No. 19208687.4, filed on Nov. 12, 2019. The foregoing patent application are incorporated herein by reference.

FIELD OF INVENTION

The invention concerns a measuring device for three-dimensional (3D) scanning of an environment using multiple transmission and reception channels.

BACKGROUND

Methods for the detection of objects or surfaces in an environment often perform a scanning by means of one or multiple distance measuring beams, e.g. pulsed modulated laser beams of a laser scanning device. The spatial positions of surface points are determined by the laser by measuring the distance to the targeted surface point and linking this measurement with position and angle information of the laser transmission. This position, angle and distance information is used to determine the spatial positions of measured points and, for example, to create a so-called 3D point cloud. Direction and distance are related to a set of measurement reference points such as the location or zero point of the measuring instrument or coordinate system.

3D scanning is a very effective technology for producing a high number of 3D coordinates of points on physical elements. Typical measurement tasks are, for example, the recording of objects or their surfaces in the environment, in the building sector, in mining or in traffic. Further 3D measuring tasks are, for example, the monitoring of an environment, for example in the context of a warning or control system or in the context of a driving assistance systems. For a completely autonomous driving system, a fully digitized environment is needed, terrestrial mapping alone seems not to be a sufficient resource.

Distance measurement units of scanners, profilers or LiDARs have become more and more accurate. Today's geodetic laser scanners have an absolute radial accuracy of better than one millimeter. The axis system, on the other hand, cannot keep up, especially with large distances. Typical directional accuracies are at 1 to 10 angular minutes, which at a distance of 20 m already results in a positional inaccuracy of 5 mm to 50 mm. The error distribution at the point to be measured on the object is therefore not spherically symmetrical but in the lateral direction by an order of magnitude less accurate compared to the radial direction. This is particularly disturbing if the dimensionally accurate image of an object to be measured is important.

Profilers or scanners are equipped with rotary axes. The measuring tracks described by the laser beams can change in space during repetitive revolutions. In the case of multiple revolutions, therefore, the same points on the object to be measured are no longer approached. Wobble and hysteresis errors of the rotating axes are occurring, especially under fast rotation beyond 50 or 100 Hz. The errors lead to alignment errors of the transmission beams and/or the visual fields of the receiving channels.

U.S. Pat. No. 7,403,269 B2 describes a Scanning Rangefinder with a rotating scanning mirror. The mirror is arranged at the top end of a rotary unit. The lower end of the rotary unit is connected by a pivot bearing to a stationary shaft formed in the centre of a bottom-plate section. The stationary shaft, the bottom plate and electro magnets fixed to the bottom plate are building the stator of a motor. The rotor of this motor is built by the lower end of the rotary unit and by permanent magnets fixed to the rotary unit. The directional accuracy of beams passing the mirror is not sufficient.

DE 10 2004 014 041 describes a sensor system with a sensor head rotating around its central axis. In the sensor head on a first level, there are several individual lasers for generating light pulses. On their way to the environment, the light pulses are passing through the area with the central axis and through an optic. The light pulses are backscattered by the environment, are passing an optic and the area with the central axis and then they are detected by a series of photodiodes located on a second level above the first level of the rotating sensor head. Distance evaluation is carried out in the rotating sensor head. Rotation of the sensor head is guided and driven by elements arranged below the sensor head, namely a sprocket and a motor driven pinion. The motor directly defines the angle increments by means of step control. The accuracy of directions assigned to emitted light pulses is not sufficient.

EP 2 656 100 B1 describes a 3D landscape imager with a rotary axis held by an air bearing. A motor is arranged at a first side of the air bearing. A rotary shaft of the motor is extending through the air bearing and is fixed to a rotary cylinder located at a second side of the air bearing. The rotary cylinder comprises emitting lenses collimating laser pulses to be sent to the landscape and receiving lenses sending returning laser pulses to a SPAD detector array. The direction of sent and received laser pulses varies after full turns of the rotary cylinder and therefore the directional accuracy of laser pulses used for distance measurements are not sufficient.

BRIEF DESCRIPTION

It an object of some embodiments of the present invention to obtain a measuring device for 3D scanning of an environment using multiple transmission and reception channels with improved directional accuracy or improved positional accuracy of measured objects, respectively.

This object may be achieved by realizing the features of claim 1. Features which further develop the invention in an alternative or advantageous manner are listed in the dependent patent claims.

The measuring device for three-dimensional scanning of an environment comprises:
  a base,
  a rotating member rotatable relative to the base about an axis of rotation,
  a transmission unit with a beam exit area arranged on the rotating member and configured to emit transmission beams via the beam exit area to different beam directions relative to the rotating member, wherein the beam directions are defined by directional data of the transmission beams comprising elevation data with respect to a reference plane perpendicular to the axis of rotation and rotational data with respect to a radial line on the reference plane,
  a receiver unit with a beam entry area arranged on the rotating member and configured to receive returning transmission beams from the beam directions via the beam entry area and to generate distance measurement data relating to emitting and receiving of the transmission beams, an angle determining unit configured to determine angular data relating to the angular orientation of the rotating member about the axis of rotation relative to the base, a computing unit configured to derive three-dimensional point cloud data by combining the distance measurement data, the angular data, and stored directional data for the respective transmission beams, a longitudinal member fixed to the base and extending in a central area of the rotating member along the axis of rotation over a range including the transmission unit with the beam exit area and the receiver unit with the beam entry area, and two bearing members arranged on the longitudinal member and on the rotating member such that the rotating member is rotatable about the axis of rotation, wherein in the direction of the axis of rotation, the transmission unit with the beam exit area and the receiver unit with the beam entry area are located between the two bearing members.

The inventive measuring device enables three-dimensional scanning of an environment with high directional accuracy of rotary movements. The measuring device guarantees high aiming accuracy in sweep mode or aiming mode. The hysteresis of the turning beams is very small.

The longitudinal member located in a central area of the rotating member and extending along the axis of rotation over a range including the transmission unit with the beam exit area and the receiver unit with the beam entry area is building the bases for a high stiffness of the rotary bearing arrangement. The stiffness is further increased by positioning the two bearing members on the longitudinal member on both sides of the transmission unit and the receiver unit. The distance between the two bearing members along the axis of rotation is preferably at least 50% of the extension of the measuring device in the direction of the axis of rotation and/or at least 80% of the extension of the rotating member in the direction of the axis of rotation.

The average outer diameter of the axis of rotation is preferably more than 10% of the distance between the two bearing members. The backlash-free positioning of the bearing members on the longitudinal member and on the rotating member increases the accuracy of the directions of the transmission beams. Further improvement of the stiffness can be enabled by using bearing members with minimal air play preferably angular contact ball bearings.

A high aiming accuracy in sweep mode or aiming mode is supported by a motor for driving the rotating member about the axis of rotation comprising cooperating first magnetic elements connected to the longitudinal member or to the base plate and second magnetic elements connected to the rotating member wherein the first and/or the second magnetic elements are electromagnetic elements. The power and torque of the motor is adapted to the mass of the rotating member and the friction of the bearing members. A high stiffness can cause increased friction and the need for a motor with increased power. An optimized selection of the bearing type and/or a preloaded spring pre-tensioning of the bearing members yields a low friction such that power consumption and heat generation is low. A low friction support also prevents negative effects of precision aiming as for example the slip-stick-effect. The pre-tensioning is optimized for the expected temperature range.

Bearing members are selected based on product requirements such as speed, rotation precision, and rotation conditions. Because of the oscillation of the sweeping mode the bearings also are stressed in a back and forth condition affecting the rotation of the outer ring. Bearing members of hybrid type, preferably with ceramic balls embedded in metal rings, are a good choice to achieve high precision under all driving conditions, this at low friction over a wide range of temperature as −30 C to +70 C. Zirconium Oxide balls with steel rings are advantageous because of having nearly identical thermal expansion coefficients. No thermal stress is induced when temperature changes. This is crucial to keep bearing play and friction optimum balanced because of the outdoor applications of the invented scanner.

The high stiffness of the rotary bearing arrangement allows under rotation of the rotating member repeated measurements in exactly the same directions with the transmission beams repeatedly being reflected from the same points of an object. Wobble or hysteresis errors are minimized.

Angle determining units are usually capable of delivering angles at frequencies of up to 10 kHz or even 100 kHz. Laser shot rates are going up to 1 Million shots per second or even 10 Million shots per second or more. In order to precisely measure the 3d coordinate of a point in 3d space, the distance, the elevation direction and the angular orientation of the rotating member or the rotation angle of the transmission beam have to be known accurately. A preferred measuring device is including an angular processing unit for interpolating or extrapolating of the angular orientation of the rotating member based on angular data determined by the angle determining unit. This angular processing unit can interpolate or extrapolate the angular direction of the transmission beams very accurately and at a high rate.

For statically mounted or slowly moving measuring devices, the distance measurements obtained over several rotations can be accumulated or averaged if the measuring device is capable to perform distance measurements at a given elevation angle exactly at the same rotational angle. A further preferred measuring device is including an angular processing unit for calculating firing time instances for the laser transmission beams so that the distance measurement data is generated for given angular orientations of the rotating member about the axis of rotation relative to the base. Using exact rotational angles derived by the angular processing unit prevents errors of state of the art measurement systems which are using measurements made at defined time intervals or with a set measurement frequency. The angular processing unit of the preferred embodiment can compensate variations of the rotation frequency caused by imperfect motors. The time instance when a certain measurement is carried out by firing laser pulses or emitting transmission beams is triggered by the angular processing unit which calculates the exactly required time instance for firing or emitting to achieve a measurement at the exactly required and defined angular orientation. This allows distance measurements at given elevation angles repetitively at exactly the same rotational angle.

Especially when emitting transmission beams in angular trigger mode, the 3D-point measurements are produced under exactly the same angular directions. The angular trigger mode uses angle interpolation or extrapolation from an angle sensor having a measurement rate much slower than the distance measurement rate, so the designated angles for the measurement directions must be interpolated or extrapolated. The angular trigger mode allows firing laser pulses or emitting transmission beams at precise directions at any measurement rate and allowing signal accumulation especially at repetitively scanned scenes.

In a preferred embodiment, the stiffness of the rotating member keeps bending and wobble error below 10 arcsec for rotating speeds up to 100 Hz. In a further preferred embodiment, the angle determining unit delivers an angle reading precision with an angular accuracy of better than 10 arcsec at rotating speeds up to 100 Hz, and/or better than 3 arcsec at rotating speeds up to 10 Hz.

The unbalance of the rotating member can be reduced by means of dynamic balancing. The symmetry of the weight distribution of the rotating member relative to the axis of rotation can be improved by locating a section of the longitudinal member in between the transmission unit and the receiver unit. Dynamic forces generated by the fast turning rotating member can be kept small and therefore almost no deflections or bending of the longitudinal member are generated. Directions of the transmission beams relative to the base plate are just rotating about the axis of rotation and therefore the stored directional data for the respective transmission beams can be used for all rotational positions of the rotating member without a reduction of accuracy. Deriving three-dimensional point cloud data by combining the distance measurement data, the angular data, and stored directional data for the respective transmission beams can be done with a very high precision at the level of a few arcseconds.

For repeated measurements with the transmission beams traversing exactly the same directions or positions on the target surfaces with high pointing accuracy, the maximum range and/or accuracy can be increased by averaging the corresponding received time-of-flight signals. An accumulating scanning mode with repeated measurements is very effective when position of the rotating axis and thus pointing of all laser beams is sufficiently precise.

The measuring device provides point clouds with high precision when used for navigational and/or mapping and/or surveying purposes on mobile platforms for example vehicles, backpacks, flying objects, robots and production or logistic devices.

Distance measuring of the embodiment with the section of the longitudinal member located in between the transmission unit and the receiver unit is improved by directly adjoining the beam exit area and the beam entry area to each other. The moment of inertia can be reduced and lower dynamic forces can be realized. In a further improved embodiment the receiver unit is extending along a single receiver axis and two opposite end parts of the transmitter unit are extending along two different transmitter axes wherein the transmitter axis of the end part of the transmitter unit with the beam exit area is extending parallel to the receiver axis.

Emitting transmission beams via the beam exit area in different beam directions relative to the rotating member is preferably enabled by at least one laser diode array arranged in the transmission beam generation area of the transmission unit. The laser diode array generates laser beams to be used for emitting the transmission beams. The transmitter unit of an embodiment with sections extending along two different transmitter axes comprises at least one optical element in between the beam generation area and the exit area, wherein the at least one optical element is shifting beams generated in the generation area to beams which are emitted from the beam exit area in the different beam directions.

The number of transmission beams can be increased by at least one optical beam splitting component of the transmission unit configured to split the laser beams generated by the at least one laser diode array into defined numbers of fanned beams which are emitted from the beam exit area in the different beam directions. All beam directions are determined by directional data comprising elevation data with respect to a reference plane perpendicular to the axis of rotation and rotational data with respect to a radial line on the reference plane.

In a preferred embodiment, the beam detecting area of the receiver unit comprises at least one detector array detecting returning transmission beams for generating the distance measurement data.

BRIEF DESCRIPTION OF THE DRAWINGS

The measuring device for three-dimensional scanning of an environment according to some embodiments of the invention is described or explained in more detail below, purely by way of example, with reference to a working example shown schematically in the drawings. Identical elements are labelled with the same reference numerals in the figures. The described embodiment is generally not shown true to scale and it is also not to be interpreted as limiting the invention. Specifically.

DETAILED DESCRIPTION

Figure 1:
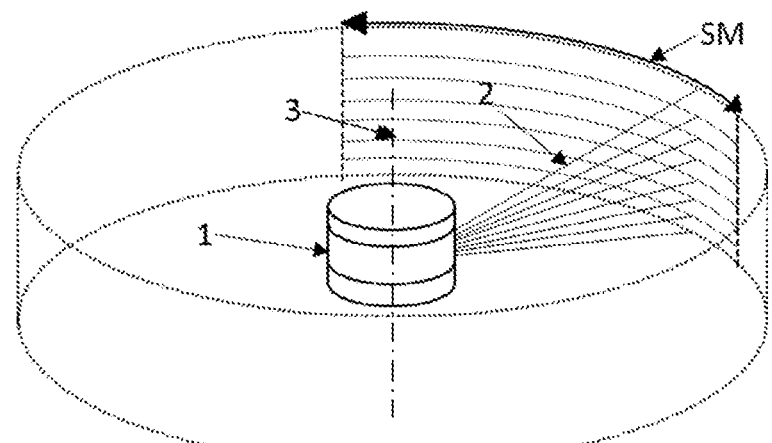
FIG. 1 is a perspective visualization of three-dimensional scanning of an environment by the measuring device.

FIG. 1 shows a measuring device 1 transmitting transmission beams 2 wherein transmission beams 2 are rotated about an axis of rotation 3. During rotation every transmission beam 2 is moving over a conical surface, a light cone, wherein all light cones have the axis of rotation 3 as common cone axis. In continuous mode of operation, the frequency of rotation is uniform and can be set between 0.5 Hz and 300 Hz. The scanned field of view covers a horizontal angle of 360 deg and a vertical angle of typically 40 deg. Depending on the morphological configuration of the instrument, the vertical angle can be extended to 150 deg. In addition to the continuous mode, a sweeping mode SM can be applied, wherein the horizontal field of view or the scan region, respectively, is typically 120 deg or less depending on the settings of the motor controller. In this sweeping mode SM a section of the surrounding, for example a scene in forward direction of a moving measuring device 1 is scanned in a repeated manner. This allows to increase maximum range and or accuracy of the distance measurement at a high rate. The pointing precision is increased by the stability of the rotating axis. Repeated measuring of the 3D-scanning, e.g the point cloud record of the target objects, is of high accuracy, for example better than 1.5 mm at a distance of 25 m.

Figure 2:
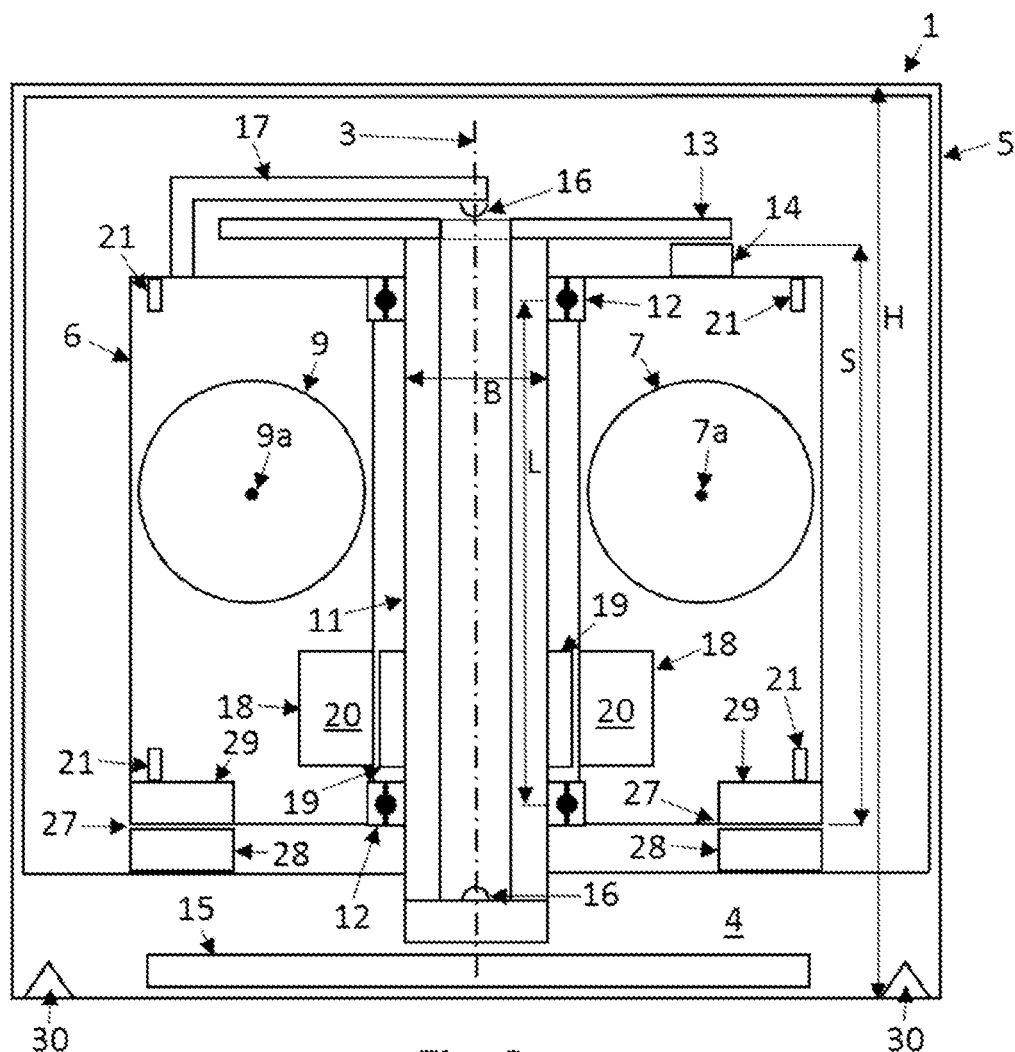
FIG. 2 is a schematic section of the measuring device in a plane including the axis of rotation of the measuring device.
Figure 3:
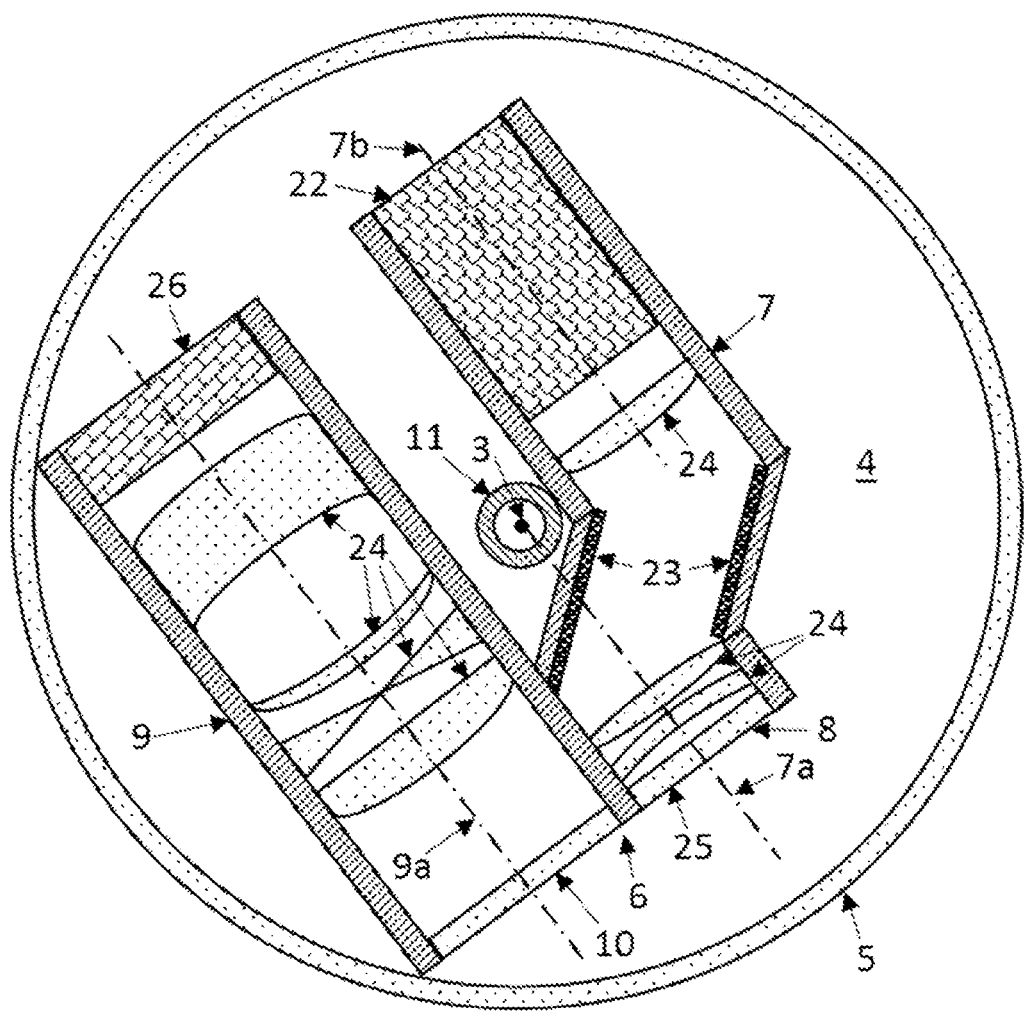
FIG. 3 is a schematic section of the measuring device in a plane orthogonal to the axis of rotation of the measuring device.

FIGS. 2 and 3 show schematic sections of the measuring device 1 comprising a base 4, a case 5 and a rotating member 6 rotatable relative to the base 4 about the axis of rotation 3. The rotating member 6 comprises a transmission unit 7 configured to emit transmission beams 2 via a beam exit area 8 to different beam directions relative to the rotating member 6. The beam directions are defined by directional data of the transmission beams 2 comprising elevation data with respect to a reference plane perpendicular to the axis of rotation 3 and rotational data with respect to a radial line on the reference plane. The arrangement of base 4 and case 5 is enclosing the rotating member 6. Case 5 is transparent for the transmission beams 2 at least in the area where the transmission beams 2 hit the case 5.

The rotating member 6 further comprises a receiver unit 9 with a beam entry area 10 configured to receive returning transmission beams 2 from the beam directions via the beam entry area 10. Data in respect of emitting transmission beams 2 and data in respect of receiving returning transmission beams 2 is used for calculating distance measurement data to points at which the corresponding transmission beams were reflected.

A longitudinal member 11 is fixed to the base 4 and extends in a central area of the rotating member 6 along the axis of rotation 3 over a range including the transmission unit 7 with the beam exit area 8 and the receiver unit 9 with the beam entry area 10. The longitudinal member 11 has a tube-like shape. Preferably, it comprises at least one cylindrical section. In the case of more than one section, the sections can have different diameters to achieve a high stiffness. The material of the longitudinal member 11 is preferably steel, carbide or ceramics such that the elastic modulus and thus the stiffness is higher than with common metals. Alloys based on tungsten carbide or titanium carbide are an alternative choice. Two bearing members 12 are arranged on the longitudinal member and on the rotating member 6 such that the rotating member 6 is rotatable about the axis of rotation 3. In the direction of the axis of rotation, the transmission unit 7 and the receiver unit 9 are located in a range between the two bearing members 12.

An angle determining unit comprises a ring or disk shaped element 13 and an angle sensor 14, wherein the angle sensor 14 is determining angular data relating to the angular orientation of the rotating member 6 about the axis of rotation 3 relative to the base 4. The ring shaped element 13 with detectable angle information can be fixed to the longitudinal member 11 or to the base 4 or to the case 5. Correspondingly, the angle sensor 14 is fixed to the rotating member 6. It is clear that the ring shaped element 13 can as well be fixed to the rotating member 6 and the angle sensor 14 to the longitudinal member 11. Typical characteristics of a fast reading angle sensor are:
angular accuracy ≤10 arcsec at a rotating speed of 100 Hz, or
angular accuracy ≤3 arcsec at a rotating speed of 10 Hz.

A computing unit 15 is configured to derive three-dimensional point cloud data by combining the distance measurement data, the angular data, and stored directional data for the respective transmission beams 2. Distance measurement data can comprise, range, intensity, range noise, SNR, signal distortion, pulse broadening, saturation flag, and more metadata or flags. The computing unit 15 is shown at the base 4. It could as well be arranged at the rotating member 6, or inside the base 4, or even separate from the base 4 and the rotating member 6. Data transmission elements 16 are using the hollow center of the longitudinal member 11 for transmitting data from the rotating member 6 to the computing unit 15. The transmission elements 16 are fixed one to the base 4 and one to a holding element 17 fixed to the rotating member 6. Data transmission between the transmission elements 16 occurs along the axis of rotation 3, preferably by light.

High aiming accuracy in sweep mode or aiming mode and low hysteresis of the turning transmission beams 2 is enabled by sufficient stiffness between the base 4 and the rotating member 6. This sufficient stiffness is created by the longitudinal member 11 extending over a range including the transmission unit 7 and the receiver unit 9 and by positioning the two bearing members 12 above and below the transmission unit 7 and the receiver unit 9. The distance L between the two bearing members 12 along the axis of rotation 3 is preferably at least 50% of the extension H of the measuring device 1 in the direction of the axis of rotation 3 and/or at least 80% of the extension S of the rotating member 6 in the direction of the axis of rotation 3.

The stiffness can be increased by a rigid construction of the longitudinal member 11. A reinforcement of the longitudinal member 11 can be used to improve rigidness of the longitudinal member 11. As known from mechanical design, stiffness depends also from the second moment of inertia, the latter can be increased by optimizing the shape e.g. by fins and grooves such that the geometrical moment of inertia becomes bigger. The stiffness also depends on the ratio of the average diameter B of the longitudinal member 11 by the distance L between the two bearing members 12 along the axis of rotation 3. This ratio B/L is preferably bigger than 10%. The bearing members 12 are backlash-free positioned on the longitudinal member 11 and on the rotating member 6.

Stiffness is further increased by a precision tolerated radial clearance of the bearings themselves and by an appropriate temperature independent axial preloading of the bearings 12 on the longitudinal member 11.

A preferred embodiment comprises an angle sensor 14 having at least three reading heads arranged around the coded ring shaped element 13, such that the radial play of the rotating axis 11 at the upper bearing and the angular wobbling motion of the rotating member 6 can be measured and used to improve the calculated angular orientation of the rotating member 6 and to improve the directions of the transmission beams 2, respectively. This improved angle sensor allows precise reading of the angular pointing direction of the transmitting transmission beams 2 even if low friction bearings are used.

A high aiming accuracy in sweep mode or aiming mode is supported by a motor 18 for driving the rotating member 6 about the axis of rotation 3. The motor 18 is comprising cooperating first magnetic elements 19 connected to the longitudinal member 11 or to the base plate 4 and second magnetic elements 20 connected to the rotating member 6 wherein the first and/or the second magnetic elements 19, 20 are electromagnetic elements. Several types of e-motors can be used to drive the rotating member 6 according to a continuous or a sweeping mode. For example, piezo or ultrasonic motors are rather fast and have a very high acceleration which is advantageous for sweeping mode. Piezo-motors do not generate axial acceleration, which is advantageous for keeping the stiffness of the rotating unit constant. For the sweeping mode a second special actuator namely a galvo-actuator can be implemented for exiting the rotating member 6 in an oscillating state at low power dissipation.

There are also torque or multipole synchronous-motors allowing high accelerations, one relevant property is their thin-structure morphology around a large diameter axis which allows a light-weight construction. These motors develop a constant torque and guarantee a uniform rotation velocity irrelevant of the revolution speed. An unbalance of the rotating member 6 can be reduced by means of positioning balancing members 21 at the rotating member 6. The symmetry of the weight distribution of the rotating member 6 relative to the axis of rotation 3 can be improved by locating a section of the longitudinal member 11 in between the transmission unit 7 and the receiver unit 9. Dynamic forces generated by the fast turning rotating member 6 can be kept small and therefore almost no deflections of the longitudinal member 11 are generated.

The section of the longitudinal member 11 located in between the transmission unit 7 and the receiver unit 9 can cause problems with receiving transmission beams 2 by the receiver unit 9. This problem is prevented by directly adjoining the beam exit area 8 and the beam entry area 10 to each other. The receiver unit 9 is extending along a single receiver axis 9a. Two opposite end parts of the transmitter unit 7 are extending along two different transmitter axes 7a, 7b. The transmitter axis 7a of the end part of the transmitter unit 7 with the beam exit area 8 is extending parallel to the receiver axis 9a.

Emitting transmission beams 2 via the beam exit area 8 in different beam directions relative to the rotating member 6 is enabled by a set of laser diodes or by at least one laser diode array arranged in the transmission beam generation area 22 of the transmission unit 7. The set of laser diodes or the laser diode array generates laser beams to be used for emitting the transmission beams. Known types of laser diodes are spatial single-mode laser diodes, broad area laser diodes, vertical cavity surface emitting laser diodes (VC-SEL), segmented laser diodes, Q-switched laser diodes, laser diode arrays and much more. The wavelength of the emitted radiation can be in the visble range e.g at 405 nm, 520 nm, 660 nm, or in the infrared e.g at 780 nm, 1064 nm, 1310 nm or 1550 nm. Today also longer wavelengths are feasible with semiconductor materials based on quantum dot technology. The transmitter unit 7 comprises at least one first optical element 23 in between the beam generation area 22 and the exit area 8, wherein the at least one optical element 23 is shifting beams generated in the beam generation area 22 to beams which are emitted from the beam exit area 8 in the different beam directions.

Further optical elements 24 for zooming and focusing are arranged in the transmitter unit 7. For beam shaping or increasing the collimation efficiency of the emitted laser radiation, beam shaping optics for example a fast axis collimation lens (FAC) can be placed in front of the set of laser diodes or laser diode array.

The number of transmission beams 2 can be increased by at least one optical beam splitting component 25 of the transmission unit 7 configured to split the laser beams generated by the at least one laser diode array into defined numbers of fanned beams which are emitted from the beam exit area 8 in the different beam directions. All beam directions are determined by directional data comprising elevation data with respect to a reference plane perpendicular to the axis of rotation and rotational or azimuthal data with respect to a radial line on the reference plane. The beam splitting component 25 for example can be realized in the form of a diffractive optical element.

The receiver unit 9 comprises a beam detecting area 26 with a set of photodetectors or with at least one photodetector array detecting returning transmission beams 2 for generating the distance measurement data. Further optical elements 24 for zooming and focusing are arranged in the receiver unit 9 such that the returning transmission beams 2 get expected pitches between each other. This setting the pitch is relevant when detector arrays are used, because the pitch of the individual sensitive areas or pixels is fixed. Not shown are other optical elements typically used for Lidars and scanners for correcting beam aberrations.

Typical photodetectors are semiconductor photodiodes, avalanche photodiodes (APD), single-photon diodes in Geiger-Mode (SPAD) or semiconductor photomultipliers consisting of hundreds or thousands of SPAD-microcells, where the latter are also called SPAD-arrays. Nearly all of these photodetectors are also available in linear array structure.

A contactless energy transmitter 27 comprises at least one electric energy transmitting element 28 fixed to the base 4 and at least one electric energy receiving element 29 fixed to the rotating member 6. The transmitted electric energy is supplied at least to the transmission unit 7 and to the receiver unit 9.

For referencing the internal coordinate system of the measuring device 1 to an external system like an inertial motion measurement system, the base plate 4 can be equipped with reference adapters 30 having a fixed position and orientation to the internal coordinate system.

Figure 4:
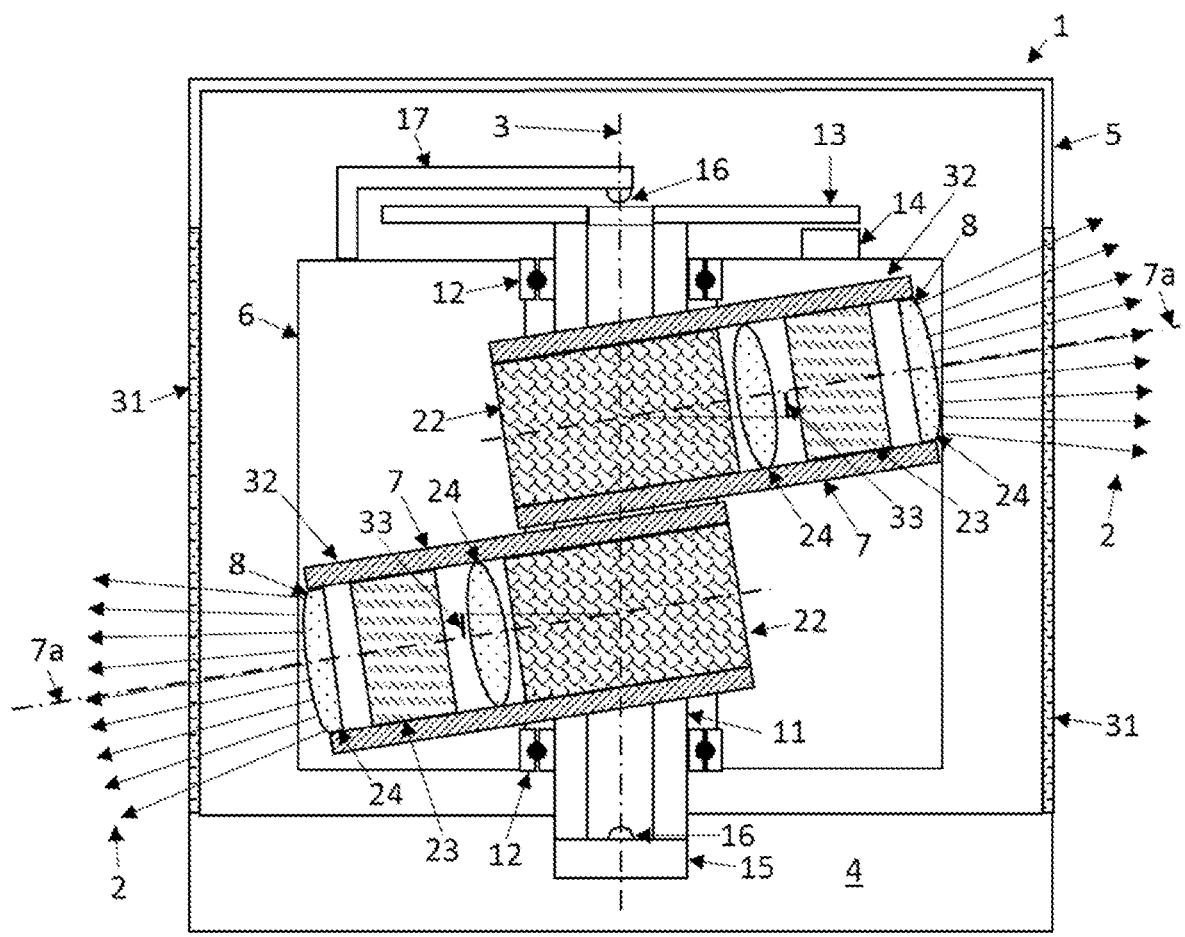
FIG. 4 is a schematic section of the measuring device in a plane including the axis of rotation of the measuring device showing two sets with a transmission and receiver units.

FIG. 4 shows another embodiment of a measuring device 1 including two zones with transmission beams 2 wherein all transmission beams 2 are rotated about the axis of rotation 3. Preferred measuring devices 1, for example profilers, scanners or Lidars, comprise 8, 16, 32, 64 or 128 transmission beams 2. To increase the number of beams for example to get a smaller angular spacing between the transmission beams 2 in direction of the elevation angle which is defined with respect to a reference plane perpendicular to the axis of rotation. Two arrangements, each with a transmission unit 7 and an associated receiver unit 9, are building two opto-electronic modules 32 arranged on the rotating member 6. The number of transmission beams 2 can be increased by adding opto-electronic modules 32. There are several possibilities to arrange opto-electronic modules 32. The alignment angles of the opto-electronic modules 32 to the rotation axis 3 can be chosen to keep the total field of view unchanged or to generate partially overlapping fields of view, wherein the density of the transmission beams 2 is increased in the overlapping zone and the total field of view is enlarged, or to generate non-overlapping fields of view, wherein the total field of view is extending over a maximum vertical angle. During rotation every transmission beam 2 sweeps over light cone, wherein all light cones can have a common cone axis 3.

What is claimed is:

1. A measuring device for performing three-dimensional scanning of an environment, the measuring device comprising:
   a base;
   a rotating member rotatable relative to the base about an axis of rotation;
   a transmission unit with a transmission beam generation area and an exit area arranged on the rotating member and configured to emit transmission beams via the beam exit area in different beam directions relative to the rotating member, wherein the beam directions are defined by directional data of the transmission beams, the directional data comprising elevation data with respect to a reference plane perpendicular to the axis of rotation and rotational data with respect to a radial line on the reference plane;
   a receiver unit with a beam entry area and a beam detecting area arranged on the rotating member and configured to receive returning transmission beams from the beam directions via the beam entry area and to generate distance measurement data relating to emitting and receiving of the transmission beams;

an angle determining unit configured to determine angular data relating to the angular orientation of the rotating member about the axis of rotation relative to the base; and a computing unit configured to derive three-dimensional point cloud data by combining the distance measurement data, the angular data, and stored directional data for the respective transmission beams, wherein:
a longitudinal member is fixed to the base and extending in a central area of the rotating member along the axis of rotation over a range including the transmission unit with the beam exit area and the receiver unit with the beam entry area, and two bearing members are arranged on the longitudinal member and on the rotating member such that the rotating member is rotatable about the axis of rotation, wherein in the direction of the axis of rotation, the transmission unit with the beam exit area and the receiver unit with the beam entry area are located between the two bearing members.

2. The measuring device according to claim 1, wherein: the distance between the two bearing members along the axis of rotation is at least 50% of the extension of the measuring device in the direction of the axis of rotation or at least 80% of the extension of the rotating member in the direction of the axis of rotation.

3. The measuring device according to claim 1, wherein the average outer diameter of the longitudinal member is more than 10% of the distance between the two bearing members along the axis of rotation.

4. The measuring device according to claim 1, wherein a section of the longitudinal member is located in between the transmission unit and the receiver unit.

5. The measuring device according to claim 1, wherein the distance between the transmission unit and the receiver unit decreases from a central area where the longitudinal member is located in between transmission unit and the receiver unit towards an outer area with the beam exit area and the beam entry area.

6. The measuring device according to claim 1, wherein the beam exit area and the beam entry area are directly adjoined.

7. The measuring device according to claim 1, wherein the receiver unit extends along a single receiver axis and two opposite end parts of the transmitter unit are extending along two different transmitter axes wherein the transmitter axis of the end part of the transmitter unit with the beam exit area is extending parallel to the receiver axis.

8. The measuring device according to claim 7, wherein the transmitter unit comprises at least one first optical element disposed in between the beam generation area and the exit area, wherein the at least one first optical element shifts beams generated in the generation area to beams which are emitted from the beam exit area in the different beam directions.

9. The measuring device according to claim 1, wherein the transmission beam generation area of the transmission unit comprises at least one laser diode array generating laser beams to be used for emitting the transmission beams.

10. The measuring device according to claim 1, wherein the beam detecting area of the receiver unit comprises at least one detector array detecting returning transmission beams for generating the distance measurement data.

11. The measuring device according to claim 1, further comprising:
a motor for driving the rotating member about the axis of rotation, the motor comprising first magnetic elements connected to the longitudinal member or the base plate and second magnetic elements connected to the rotating member wherein the first magnetic element or the second magnetic element are electromagnetic elements allowing to drive the rotating member up to 300 Hz.

12. The measuring device according to claim 1, wherein the measuring device is including an angular processing unit for interpolating or extrapolating of the angular orientation of the rotating member based on angular data determined by the angle determining unit.

13. The measuring device according to claim 1, wherein the bearing members are of hybrid type.

14. The measuring device according to claim 1, wherein the stiffness of the rotating member keeps bending and wobble error below 10 arcsec for rotating speeds up to 100 Hz.

15. The measuring device according to claim 1, wherein the angle determining unit delivers an angle reading precision with an angular accuracy of better than 10 arcsec at rotating speeds up to 100 Hz, or better than 3 arcsec at rotating speeds up to 10 Hz or comprises an angle sensor having at least three reading heads around the ring shaped element, such that both the radial play and the angular wobbling motion of the longitudinal member is measured and used for determining the directions of the transmission beams.

* * * * *